(12) United States Patent
Kurachi et al.

(10) Patent No.: US 6,547,980 B1
(45) Date of Patent: Apr. 15, 2003

(54) GLASS SUBSTRATE FOR INFORMATION RECORDING MEDIUM, MANUFACTURING METHOD THEREOF, AND INFORMATION RECORDING MEDIUM

(75) Inventors: Junji Kurachi, Osaka (JP); Akihiro Koyama, Osaka (JP); Nobuyuki Yamamoto, Osaka (JP); Yasuhiro Saito, Osaka (JP); Kazuishi Mitani, Osaka (JP); Koichi Ataka, Osaka (JP); Yoshihiro Matsuno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/194,787

(22) Filed: Jul. 12, 2002

Related U.S. Application Data

(62) Division of application No. 09/569,754, filed on May 12, 2000, now Pat. No. 6,440,531.

(30) Foreign Application Priority Data

May 13, 1999 (JP) ............................................. 11-132371
May 12, 2000 (JP) ........................................ 2000-139675

(51) Int. Cl.$^7$ ........................... G11B 5/82; C03C 17/00; C03C 3/076

(52) U.S. Cl. ............................... 216/97; 65/30.1; 65/31; 65/61; 65/66; 65/111

(58) Field of Search ........................... 65/30.1, 31, 61, 65/66, 111; 216/97

(56) References Cited

U.S. PATENT DOCUMENTS

| | | | | |
|---|---|---|---|---|
| 4,833,001 A | * | 5/1989 | Kijima et al. | 65/31 |
| 5,833,871 A | * | 11/1998 | Matsushita et al. | 216/97 |
| 5,871,654 A | * | 2/1999 | Mannami et al. | 216/97 |
| 6,048,466 A | * | 4/2000 | Morizane et al. | 216/97 |
| 6,134,918 A | * | 10/2000 | Eto et al. | 65/30.14 |
| 6,383,404 B1 | * | 5/2002 | Sakai et al. | 216/97 |

FOREIGN PATENT DOCUMENTS

| | | |
|---|---|---|
| JP | 46-4271 | 2/1971 |
| JP | 62-187140 | 8/1987 |
| JP | 5-032431 | 2/1993 |
| JP | 9-022525 A | 1/1997 |

\* cited by examiner

Primary Examiner—Stevan A. Resan
(74) Attorney, Agent, or Firm—Merchant & Gould P.C.

(57) ABSTRACT

A glass substrate for an information recording medium has an acid resistance represented by an etching rate of at most 45 nm/min. upon contact with a hydrofluoric acid having a temperature of 50° C. and a concentration of 0.1 weight %. The glass substrate has a recording surface having an average surface roughness Ra smaller than 0.3 nm.

6 Claims, 2 Drawing Sheets

GLASS SUBSTRATE FOR INFORMATION RECORDING MEDIUM, MANUFACTURING METHOD THEREOF, AND INFORMATION RECORDING MEDIUM

This application is a Division of application Ser. No. 09/569,754, filed May 12, 2000 now U.S. Pat. No. 6,440,531, which application(s) are incorporated herein by reference.

BACKGROUND OF THE INVENTION

1. Field of the Invention

The present invention relates to a glass substrate for an information recording medium such as a magnetic disk or the like, and more particularly to a highly acid-resistant glass substrate having an excellent level of surface smoothness.

2. Description of the Related Art

Generally, aluminum substrates are used as substrates for use in information recording mediums. However, since it is difficult for aluminum substrates to increase their surface smoothness, the aluminum substrates are not suitable for use in disks for high-density recording. Instead, glass substrates which have a high level of surface hardness and which can be polished to a high level of surface smoothness are used in disks for high-density recording.

Glass substrates for use in information recording mediums are fabricated by forming a molten material according to a float process, a rod process, and a press process, cutting the formed material to a desired substrate shape, if necessary, and thereafter polishing the substrate to adjust its thickness and surface smoothness to a predetermined range. If desired, the polished substrate is strengthened by an ion exchange or the like. Consequently, fine particles of foreign matter, primarily a polishing compound, remain attached to the surface of the substrate. While those fine particles of foreign matter cannot completely be removed from the substrate by an ordinary cleaning process, they have heretofore posed no significant problems. However, the present trend toward high-density information recording mediums inevitably demands a smaller gap between the information recording medium and the head for reading information from and writing information in the information recording medium. The fine particles of foreign matter need to be removed from the substrate as completely as possible because they would tend to hit the head and cause an error or crash because of the small gap between the information recording medium and the head. Though complete removal of fine particles of foreign matter from the substrate cannot easily be performed, they can efficiently be removed when they are dissolved by an acid such as sulfuric acid, hydrofluoric acid, etc., or the surface of the substrate is etched.

Japanese patent publication No. 46-4271 discloses a chemically strengthened glass composed of 1 to 5 weight % of MgO, 0 to 5 weight % of $K_2O$, 5 to 25 weight % of $Na_2O$, 5 to 25 weight % of $Al_2O_3+Zro_2$, and $SiO_2$, the sum of which is 80% or more of the entire composition. However, the disclosed glass is poor in acid resistance and hence cannot be treated by an acid for the removal of foreign matter therefrom.

Japanese laid-open patent publication No. 5-32431 discloses another chemically strengthened glass of improved acid resistance which is composed of 62 to 75 weight % of $SiO_2$, 5 to 15 weight % of $Al_2O_3$, 4 to 10 weight % of $Li_2O$, 4 to 12 weight % of $Na_2O$, and 5.5 to 15 weight % of $ZrO_2$, with the weight ratio of $Na_2O/ZrO_2$ being in the range from 0.5 to 2.0 and the weight ratio of $Al_2O_3/ZrO_2$ being in the range from 0.4 to 2.5. The publication, however, fails to show a causal dependence of the acid resistance on surface irregularities. Furthermore, since the glass revealed in the publication contains a large amount of $ZrO_2$, $Zro_2$ tends to be separated out as fine crystals in the glass, which project on the surface after it is polished and are liable to cause an error and crash.

Japanese laid-open patent publication No. 62-187140 reveals still another chemically strengthened glass composed of 64 to 70 weight % of $SiO_2$, 14 to 20 weight % of $Al_2O_3$, 4 to 6 weight % of $Li_2O$, 7 to 10 weight % of $Na_2O$, 0 to 4 weight % MgO, and 0 to 1.5 weight % of $ZrO_2O$. However, the publication also fails to show a causal dependence of the acid resistance on surface irregularities.

Japanese laid-open patent publication No. 9-22525 discloses a process of cleaning a glass substrate pulled up out of a strengthening liquid with a solution containing an acid, in the fabrication of a glass substrate for use in a magnetic disk. The disclosed process is aimed at only the removal of a chemically strengthening salt. The publication is silent as to the acid resistance which the glass substrate is required to have, and does not suggest or describe the level of surface smoothness in question.

SUMMARY OF THE INVENTION

It is therefore an object of the present invention to provide a glass substrate for an information recording medium which can easily be treated by an acid to achieve high cleanliness and high smoothness.

To achieve the above object, there is provided in accordance with the present invention a glass substrate for an information recording medium having at least one surface as a recording surface, the glass substrate having an acid resistance represented by an etching rate of at most 45 nm/min. upon contact with a hydrofluoric acid having a temperature of 50° C. and a concentration of 0.1 weight %, at least the recording surface having an average surface roughness Ra smaller than 0.3 nm.

When glass is etched by an acid, the components of the glass are not uniformly dissolved, but those components which are weaker on the acid are dissolved at first, and then those stronger on the acid are dissolved gradually. The components which are weaker on the acid include alkali, alkaline earth group, alumina, etc., and those stronger on the acid include silica, zirconia, titania, etc. The surface of the glass treated with the acid, as microscopically observed, has a porous layer of network structure mainly composed of silica, zirconia, titania, etc. When the substrate thus produced is cleaned by an alkali for the purposes of removing the porous layer and fats and oils, since the porous layer is thick and unevenly dissolved by the alkali if the substrate is low in acid resistance, pores appear on the surface, producing surface irregularities which make it impossible to achieve a level of surface smoothness that is required by the information recording medium. It has been found according to the present invention that in order to keep the surface smoothness (average surface roughness) Ra of the substrate in the range of Ra<0.3 nm when cleaned by the alkali after having been treated with the acid, the etching rate of the substrate glass with an aqueous solution of 0.1 weight % of hydrofluoric acid at a temperature of 50° C., as an indication of acid resistance, needs to be 45 nm/min. or less.

An acid liquid used in the present invention serves to dissolve a polishing compound on the glass substrate or etch the surface of the glass substrate to remove a polishing compound therefrom. The acid liquid may include an inorganic acid such as hydrofluoric acid, a mixture of hydrofluoric acid and ammonium fluoride, hydrochloric acid, sulfuric acid, nitric acid, phosphoric acid, etc., or an organic acid such as sulfamic acid, formic acid, oxalic acid, citric acid, malic acid, hydroxyacetic acid, gluconic acid, etc.

A polishing compound mainly composed of cerium oxide, which is used most generally, can be removed most efficiently when it is dissolved in an aqueous solution of sulfuric acid. If the concentration of the sulfuric acid used to remove the polishing compound were less than 0.01 weight %, then the removing ability would be insufficient, and if the concentration of the sulfuric acid exceeded 5 weight %, then fine defects of the glass substrate would appear on the surface. Therefore, the concentration of the sulfuric acid should preferably in the range from 0.01 to 5 weight %. In order to keep a desired level of surface smoothness under this condition, the etching rate of the substrate glass with an aqueous solution of 0.1 weight % of hydrofluoric acid at a temperature of 50° C. should preferably be 45 nm/min. or less.

Even if a polishing compound other than cerium oxide is used, the attached polishing compound can be removed irrespective of its type by etching the substrate surface with an acid having a high etching effect, such as hydrofluoric acid. If the concentration of the hydrofluoric acid used to remove the polishing compound were less than 0.002 weight %, then the removing ability would be insufficient, and if the concentration of the hydrofluoric acid exceeded 1 weight %, then fine defects of the glass substrate would appear on the surface. Therefore, the concentration of the hydrofluoric acid should preferably in the range from 0.002 to 1 weight %. In order to require the glass to have a high level of acid resistance and keep a desired level of surface smoothness, the etching rate of the substrate glass with an aqueous solution of 0.1 weight % of hydrofluoric acid at a temperature of 50° C. should preferably be 30 nm/min. or less.

The composition of the glass substrate which meets the requirement for the etching rate of 45 nm/min. or less with the aqueous solution of 0.1 weight % of hydrofluoric acid is preferably as follows from the standpoint of glass solubility and substrate weather resistance: In terms of molar fractions, the difference between $SiO_2$ and $Al_2O_3$ ($SiO_2$-$Al_2O_3$): 56.5%, $SiO_2$: 63–70%, $Al_2O_3$: 4–11%, $Li_2O$: 5–11%, $Na_2O$: 6–14%, $K_2O$: 0–2%, $TiO_2$: 0–5%, $ZrO_2$: 0–2.5%, RO: 2–15% (RO=MgO+CaO+SrO+BaO, MgO: 0–6%, CaO: 1–9%, SrO: 0–3%, BaO: 0–2%), and other components: 3% or less. The glass composition will hereinafter be expressed in terms of molar fractions unless otherwise specified.

The composition of the glass substrate which meets the requirement for the etching rate of 30 nm/min. or less with the aqueous solution of 0.1 weight % of hydrofluoric acid is preferably substantially the same as the above composition except that the difference $SiO_2$—$Al_2O_3$ is 58.5%, from the standpoint of glass solubility and substrate weather resistance.

From the standpoint of solubility, a glass composition similar to the above composition except that $TiO_2$: 0–3% and $ZrO_2$: 0–2% is more advantageous as the devitrification temperature is lower.

The reasons for the limitations of the glass composition acre as follows:

The etching rate based on the aqueous solution of 0.1 weight % of hydrofluoric acid depends strongly on the difference $SiO_2$—$Al_2O_3$ as expressed by a molar fraction. If the difference $SiO_2$—$Al_2O_3$ were less than 56.5%, then the alkaline component would be required to be greatly reduced in order to make the etching rate equal to or less than 45 nm/min. through adjustments of other components. The resultant composition would have a high dissolving temperature, and would not easily be chemically strengthened by an ion exchange.

The same problem would arise if the etching rate were 30 nm/min. or less with the difference $SiO_2$—$Al_2O_3$ being 58.5% or less. Therefore, in order to make the etching rate equal to or less than 45 nm/min. or 30 nm/min., the difference $SiO_2$—$Al_2O_3$ should preferably be 56.5% or 58.5% or higher.

$SiO_2$ is a major component of the glass. If the proportion of $SiO_2$ were less than 63%, then the chemical durability of the glass would be lowered. If the proportion of $SiO_2$ were in excess of 70%, then the viscosity would increase to the extent that it would be difficult to melt the glass. Therefore, the proportion of $SiO_2$ should preferably range from 63% to 70%.

$Al_2O_3$ is a component for increasing the depth of a compressive stress layer due to an ion exchange and also increasing the water resistance of the glass. If the proportion of $Al_2O_3$ were less than 4%, the above effects would not sufficiently be developed. If the proportion of $Al_2O_3$ were greater than 11%, the viscosity would increase and the liquid phase temperature would increase more than the viscosity, resulting in a reduction in solubility. Therefore, the proportion of $Al_2O_3$ should preferably range from 4% to 11%, and more preferably range from 6% to 11%.

$Li_2O$ is a component to be exchanged in an ion exchange and to increase the solubility. If the ratio of $Li_2O$ were less than 5%, the compressive stress after the ion exchange would become insufficient and the viscosity would increase to the extent that it would be difficult to melt the glass. If the ratio of $Li_2O$ exceeded 11%, then the weather resistance and acid resistance of the substrate would be lowered. Therefore, the proportion of $Li_2O$ should preferably range from 5% to 11%.

$Na_2O$ is a component to be exchanged in an ion exchange and to increase the solubility. If the ratio of $Na_2O$ were less than 6%, the compressive stress after the ion exchange would become insufficient and the viscosity would increase to the extent that it would be difficult to melt the glass. If the ratio of $Na_2O$ exceeded 14%, then the weather resistance and acid resistance of the substrate would be lowered. Therefore, the proportion of $Na_2O$ should preferably be equal to or less than 14%.

$K_2O$ is a component to increase the solubility. If the proportion of $K_2O$ exceeded 2%, then the weather resistance would be lowered, and the surface compressive stress after the ion exchange would be reduced. Therefore, the proportion of $K_2O$ should preferably be equal to or less than 2%.

$TiO_2$ is a component to increase the weather resistance of the glass. If the proportion of $TiO_2$ exceeded 5%, then the liquid phase temperature of the glass would rise and the devitrification resistance would be lowered. Therefore, the proportion of $TiO_2$ should preferably be equal to or less than 5%, and more preferably be equal to or less than 3%.

$ZrO_2$ is a component to increase the weather resistance of thief glass. If the proportion of $ZrO_2$ were in excess of 2.5%, the possibility for $ZrO_2$ to be separated out as fine crystals when melted would be increased. Therefore, the proportion of $ZrO_2$ should preferably be equal to or less than 2.5%, and more preferably be equal to or less than 2%.

MgO is a component to increase the solubility of the glass. If the proportion of MgO were in excess of 6%, then the liquid phase temperature of the glass would rise and the devitrification resistance would be lowered. Therefore, the proportion of MgO should preferably be equal to or less than 6%, and more preferably be equal to or less than 4.5%.

CaO is a component to increase the solubility and the thermal expansion coefficient of the glass. If the proportion of CaO were less than 2%, then the effect to increase the solubility and the thermal expansion coefficient of the glass would be small. If CaO existed together with either of SrO or BaO, or both of SrO and BaO, then the effect would be sufficiently produced in the proportion equal to or more than 1%. If the proportion of CaO were in excess of 7.5%, then the liquid phase temperature of the glass would tend to rise. If the proportion of CaO were in excess of 9%, then such tendency would be remarkable. Therefore, the proportion of CaO should preferably be in the range from 1 to 9%, more preferably be in the range from 2 to 7.5%.

SrO is a component to increase the solubility and the thermal expansion coefficient of the glass. The effect of SrO to increase the thermal expansion coefficient is higher than that of CaO. However, if the glass contained a large amount of SrO, then the specific gravity of the glass would increase. The proportion of SrO should preferably be equal to or less than 3%.

BaO is a component to increase the solubility and the thermal expansion coefficient of the glass. The effect of. BaO to increase the thermal expansion coefficient is higher than that of CaO and SrO. However, if the glass contained a large amount of BaO, then the specific gravity of the glass would increase. The proportion of BaO should preferably be equal to or less than 2%.

If the proportion of the sum of MgO+CaO+SrO+BaO (RO) were smaller than 2%, then the solubility would be insufficient. If the proportion of the sum would exceed 15%, then the liquid phase temperature of the glass would rise and the devitrification resistance would be lowered. Therefore, the proportion of the sum (RO) should preferably range from 2 to 15%, and more preferably range from 2 to 12%.

In addition to the above components, other components including $As_2O_3$, $Sb_2O_3$, $SO_3$, $SnO_2$, $Fe_2O_3$, CoO, Cl, F, etc., for example, may be added in a total proportion up to 3% for the purpose of cleaning the glass when melted.

Since the glass substrate contains lithium, an ion exchange may be performed in a molten salt including ions of potassium, sodium, or both for imparting compressive stresses to the glass surface to increase the fracture strength.

An information recording medium which is fabricated using the above glass substrate has a high level of surface smoothness and is free of surface projections due to foreign matter. Therefore, the height of a magnetic head which is lifted from the surface of the information recording medium can be reduced for recording information at a high density on the information recording medium.

The treatment with the acid described above can be carried out anytime after a process of polishing the glass substrate to a mirror finish and immediately before the growth of a recording layer on the glass substrate.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
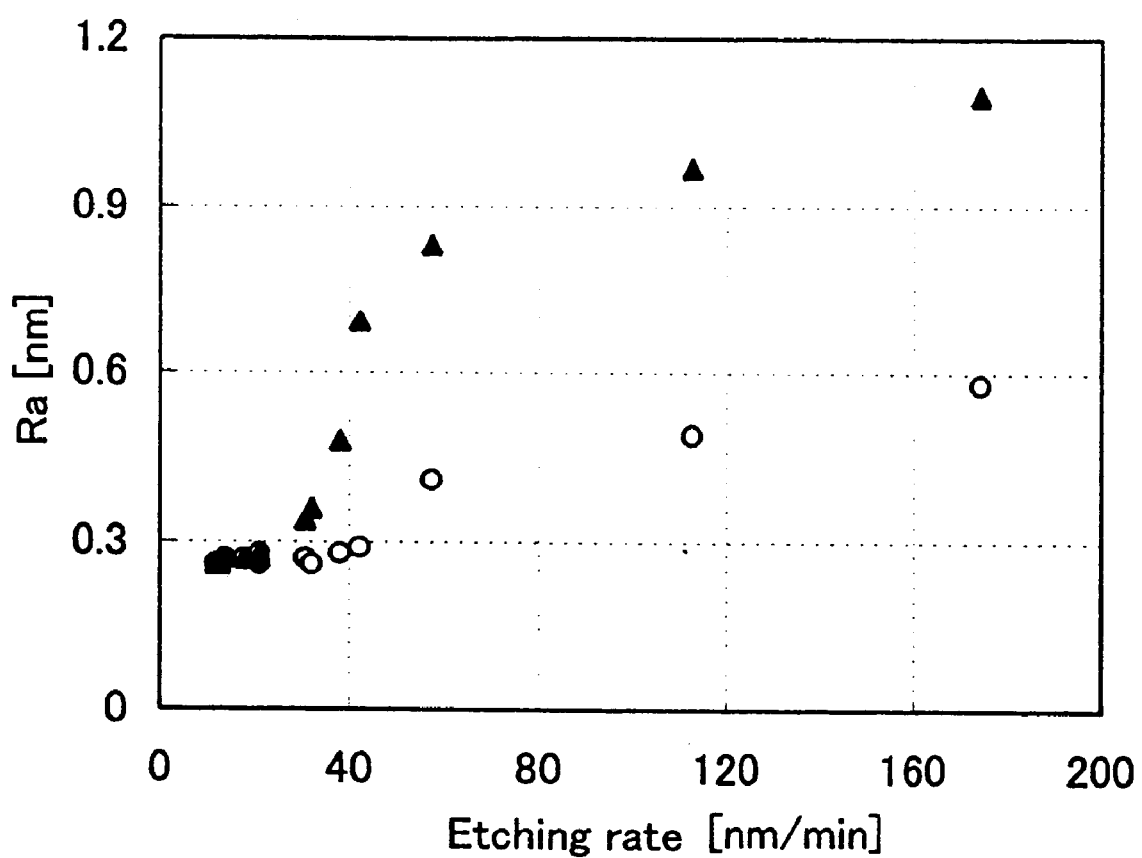
FIG. 1 is a graph showing the relationship between etching rates with a hydrofluoric acid having a concentration of 0.1 weight % at a temperature of 50° C. and surface roughnesses after being treated with an acid and an alkali.

Tables 1 through 4 show details of 31 Inventive Examples and 3 Comparative Examples.

TABLE 1

| | Inventive Examples | | | | | | | | | |
|---|---|---|---|---|---|---|---|---|---|---|
| | 1 | 2 | 3 | 4 | 5 | 6 | 7 | 8 | 9 | 10 |
| Composition mol % | | | | | | | | | | |
| $SiO_2$ | 67.78 | 67.78 | 67.32 | 66.31 | 67.50 | 68.00 | 66.62 | 66.00 | 66.50 | 66.84 |
| $Al_2O_3$ | 7.18 | 7.18 | 7.11 | 7.07 | 8.50 | 9.00 | 8.60 | 8.50 | 9.50 | 9.87 |
| $Li_2O$ | 5.37 | 5.37 | 5.31 | 5.21 | 8.00 | 8.00 | 6.43 | 8.00 | 9.00 | 7.38 |
| $Na_2O$ | 11.04 | 11.04 | 10.93 | 12.27 | 8.54 | 7.54 | 10.85 | 8.54 | 12.00 | 8.56 |
| $K_2O$ | 0.19 | 0.19 | 0.18 | 0.17 | 0.00 | 0.00 | 0.18 | 0.00 | 0.00 | 0.18 |
| MgO | 2.60 | 3.41 | 1.87 | 2.81 | 2.98 | 2.98 | 2.96 | 2.98 | 0.00 | 2.88 |
| CaO | 3.90 | 5.04 | 7.27 | 4.14 | 4.48 | 4.48 | 4.37 | 4.48 | 3.00 | 4.25 |
| SrO | 0 | 0 | 0 | 1.98 | 0 | 0 | 0 | 0 | 0 | 0 |
| BaO | 1.95 | 0 | 0 | 0 | 0 | 0 | 0 | 0 | 0 | 0 |
| $TiO_2$ | 0 | 0 | 0 | 0 | 0 | 0 | 0 | 1.5 | 0 | 0 |
| $ZrO_2$ | 0 | 0 | 0 | 0 | 0 | 0 | 0 | 0 | 0 | 0 |
| $SiO_2$—$Al_2O_3$ | 60.60 | 60.60 | 60.21 | 59.24 | 59.00 | 59.00 | 58.02 | 57.50 | 57.00 | 56.97 |
| $R_2O$ | 16.60 | 16.60 | 16.48 | 17.65 | 16.54 | 15.54 | 17.46 | 16.54 | 21.06 | 16.12 |
| RO | 8.45 | 8.45 | 8.94 | 8.93 | 7.46 | 7.46 | 7.33 | 7.46 | 3.00 | 7.13 |
| Melting Temperature Tm (° C.) | 1516 | 1535 | 1501 | 1477 | 1563 | 1580 | 1543 | 1535 | 1530 | 1579 |
| Working Temperature Tw (° C.) | 1035 | 1047 | 1029 | 1002 | 1039 | 1069 | 1050 | 1046 | 1009 | 1068 |
| Liquid Phase Temperature Tl (° C.) | Unrecognizable | 1020 | 1023 | Unrecognizable | 1004 | 1041 | 1004 | 1003 | Unrecognizable | 1038 |
| $T_w$–$T_l$ (° C.) | 105 or greater | 27 | 6 | 72 or greater | 35 | 28 | 46 | 43 | 79 or greater | 30 |
| Density (g/cm3) | 2.56 | 2.47 | 2.49 | 2.56 | 2.47 | 2.46 | 2.47 | 2.49 | 2.47 | 2.47 |

TABLE 1-continued

| | Inventive Examples | | | | | | | | | |
|---|---|---|---|---|---|---|---|---|---|---|
| | 1 | 2 | 3 | 4 | 5 | 6 | 7 | 8 | 9 | 10 |
| Average Thermal Expansion Coefficient, ×$10^{-7}$ °C.$^{-1}$, 50~350° C. | 89 | 93 | 94 | 93 | 89 | 86 | 92 | 88 | 94 | 87 |
| Etching Rate (nm/min), 50° C., 0.1% Hydrofluoric acid | 13 | 12 | 14 | 18 | 21 | 21 | 31 | 32 | 38 | 42 |
| Surface Roughness after cleaning Ra (nm) | | | | | | | | | | |
| Sulfuric acid 1% | 0.26 | 0.26 | 0.27 | 0.27 | 0.28 | 0.26 | 0.27 | 0.26 | 0.28 | 0.29 |
| Hydrofluoric acid 0.005% | 0.26 | 0.26 | 0.27 | 0.27 | 0.28 | 0.27 | 0.34 | 0.36 | 0.48 | 0.59 |
| Number of Projections, 3 nm or higher, Projections/50 × 50 μm | | | | | | | | | | |
| Sulfuric acid 1% | 15 | 10 | 13 | 18 | 15 | 13 | 17 | 14 | 14 | 18 |
| Hydrofluoric acid 0.005% | 18 | 12 | 14 | 19 | 13 | 10 | 19 | 18 | 50 | 366 |

TABLE 2

| | Inventive Examples | | | | | | | | | |
|---|---|---|---|---|---|---|---|---|---|---|
| | 11 | 12 | 13 | 14 | 15 | 16 | 17 | 18 | 19 | 20 |
| Composition mol % | | | | | | | | | | |
| $SiO_2$ | 67.51 | 67.22 | 66.62 | 64.84 | 64.84 | 66.84 | 68.84 | 65.42 | 68.42 | 67.51 |
| $Al_2O_3$ | 5.93 | 6.87 | 6.87 | 5.87 | 5.87 | 7.87 | 5.87 | 6.87 | 7.01 | 5.93 |
| $Li_2O$ | 5.43 | 7.38 | 7.38 | 7.38 | 7.38 | 7.38 | 7.38 | 8.88 | 5.49 | 9.47 |
| $Na_2O$ | 12.69 | 12.06 | 12.06 | 11.56 | 10.56 | 10.56 | 10.56 | 10.56 | 9.75 | 8.65 |
| $K_2O$ | 0.18 | 0.00 | 0.00 | 0.18 | 0.18 | 0.18 | 0.18 | 0.00 | 2.00 | 0.18 |
| MgO | 0.89 | 1.88 | 4.28 | 2.88 | 5.38 | 1.38 | 2.88 | 1.88 | 2.94 | 0.89 |
| CaO | 7.32 | 4.55 | 2.75 | 7.25 | 5.75 | 1.75 | 4.25 | 6.35 | 4.34 | 7.32 |
| SrO | 0 | 0 | 0 | 0 | 0 | 0 | 0 | 0 | 0 | 0 |
| BaO | 0 | 0 | 0 | 0 | 0 | 4 | 0 | 0 | 0 | 0 |
| $TiO_2$ | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 0 |
| $SiO_2$—$Al_2O_3$ | 61.58 | 60.35 | 59.75 | 58.97 | 58.97 | 58.97 | 62.97 | 58.55 | 61.41 | 61.58 |
| $R_2O$ | 18.29 | 19.43 | 19.43 | 19.11 | 18.11 | 18.11 | 18.11 | 19.43 | 17.24 | 18.29 |
| RO | 8.21 | 6.43 | 7.03 | 10.13 | 11.13 | 7.13 | 7.13 | 8.23 | 7.28 | 8.21 |
| Melting Temperature Tm (° C.) | — | 1503 | 1532 | — | — | 1511 | 1539 | 1491 | 1551 | — |
| Working Temperature Tw (° C.) | — | 1006 | 1012 | — | — | 1008 | 1008 | 1002 | 1064 | — |
| Liquid Phase Temperature Tl (° C.) | 1017 | 945 | 924 | 1006 | 1036 | 925 | 923 | 961 | 996 | 1013 |
| $T_w$-$T_l$ (° C.) | — | 61 | 88 | — | — | 83 | 85 | 41 | 68 | — |
| Density (g/cm3) | 2.50 | 2.47 | 2.47 | 2.51 | 2.50 | 2.61 | 2.46 | 2.49 | 2.46 | 2.48 |
| Average Thermal Expansion Coefficient, ×$10^{-7}$ °C.$^{-1}$, 50~350° C. | 98 | 98 | 96 | 96 | 96 | 96 | 96 | 96 | 94 | 93 |
| Etching Rate (nm/min), 50° C., 0.1% Hydrofluoric acid | 13 | 16 | 18 | 26 | 26 | 33 | 6 | 23 | 20 | 8 |
| Surface Roughness after cleaning Ra (nm) | | | | | | | | | | |
| Sulfuric acid 1% | 0.28 | 0.28 | 0.29 | 0.27 | 0.29 | 0.29 | 0.27 | 0.28 | 0.25 | 0.29 |
| Hydrofluoric acid 0.005% | 0.26 | 0.26 | 0.26 | 0.28 | 0.29 | 0.29 | 0.26 | 0.29 | 0.26 | 0.26 |
| Number of Projections, 3 nm or higher, Projections/50 × 50 μm | | | | | | | | | | |
| Sulfuric acid 1% | 10 | 12 | 16 | 22 | 22 | 22 | 9 | 21 | 8 | 14 |
| Hydrofluoric acid 0.005% | 12 | 36 | 43 | 12 | 16 | 69 | 35 | 14 | 132 | 36 |

TABLE 3

| | Inventive Examples | | | | | | | | | |
|---|---|---|---|---|---|---|---|---|---|---|
| | 21 | 22 | 23 | 24 | 25 | 26 | 27 | 28 | 29 | 30 | 31 |
| Composition mol % | | | | | | | | | | | |
| $SiO_2$ | 67.82 | 67.84 | 66.84 | 67.18 | 65.52 | 66.84 | 66.84 | 66.84 | 66.84 | 67.84 | 67.51 |
| $Al_2O_3$ | 6.87 | 6.87 | 7.87 | 7.01 | 8.87 | 7.87 | 7.87 | 7.87 | 7.87 | 6.87 | 5.93 |

TABLE 3-continued

| | Inventive Examples | | | | | | | | | | |
|---|---|---|---|---|---|---|---|---|---|---|---|
| | 21 | 22 | 23 | 24 | 25 | 26 | 27 | 28 | 29 | 30 | 31 |
| $Li_2O$ | 8.88 | 7.38 | 7.38 | 9.57 | 7.38 | 7.38 | 6.38 | 7.38 | 7.38 | 7.38 | 5.43 |
| $Na_2O$ | 10.56 | 10.56 | 10.56 | 8.73 | 10.56 | 10.06 | 11.56 | 10.56 | 10.06 | 10.56 | 12.69 |
| $K_2O$ | 0.00 | 0.18 | 0.18 | 0.18 | 0.00 | 0.68 | 0.18 | 0.18 | 0.68 | 0.18 | 0.18 |
| MgO | 3.08 | 0.88 | 2.88 | 2.94 | 3.08 | 2.38 | 2.88 | 1.88 | 2.38 | 2.88 | 5.94 |
| CaO | 2.75 | 6.25 | 4.25 | 4.34 | 4.55 | 3.25 | 4.25 | 5.25 | 3.25 | 4.25 | 2.27 |
| SrO | 0 | 0 | 0 | 0 | 0 | 1.5 | 0 | 0 | 0 | 0 | 0 |
| BaO | 0 | 0 | 0 | 0 | 0 | 0 | 0 | 0 | 0 | 0 | 0 |
| $TiO_2$ | 0 | 0 | 0 | 0 | 0 | 0 | 0 | 0 | 1.5 | 0 | 0 |
| $ZrO_2$ | 0 | 0 | 0 | 0 | 0 | 0 | 0 | 0 | 0 | 0 | 0 |
| $SiO_2$—$Al_2O_3$ | 60.95 | 60.97 | 58.97 | 60.17 | 56.65 | 58.97 | 58.97 | 58.97 | 58.97 | 60.97 | 61.58 |
| $R_2O$ | 19.43 | 18.11 | 18.11 | 18.48 | 17.93 | 18.11 | 18.11 | 18.11 | 18.11 | 18.11 | 18.29 |
| RO | 5.83 | 7.13 | 7.13 | 7.28 | 7.63 | 7.13 | 7.13 | 7.13 | 5.63 | 7.13 | 8.21 |
| Melting Temperature Tm (° C.) | 1546 | — | 1540 | 1551 | 1536 | 1504 | 1531 | 1527 | 1516 | 1540 | 1540 |
| Working Temperature Tw (° C.) | 1005 | — | 1024 | 1005 | 1030 | 1005 | 1037 | 1016 | 1050 | 1014 | 1043 |
| Liquid Phase Temperature Tl (° C.) | 910 | 1006 | 990 | 968 | 995 | 938 | 982 | 971 | 923 | 963 | 971 |
| $T_w$—$T_l$ (° C.) | 95 | — | 34 | 37 | 35 | 67 | 55 | 45 | 127 | 51 | 72 |
| Density (g/cm3) | 2.46 | 2.48 | 2.47 | 2.46 | 2.48 | 2.49 | 2.47 | 2.48 | 2.47 | 2.47 | 2.47 |
| Average Thermal Expansion Coefficient, $\times 10^{-7}$ $C.^{-1}$, 50–350° C. | 93 | 92 | 92 | 91 | 90 | 94 | 92 | 94 | 90 | 93 | 93 |
| Etching Rate (nm/min), 50° C., 0.1% Hydrofluoric acid | 14 | 13 | 23 | 13 | 35 | 20 | 24 | 22 | 18 | 12 | 10 |
| Surface Roughness after cleaning Ra (nm) | | | | | | | | | | | |
| Sulfuric acid 1% | 0.29 | 0.28 | 0.28 | 0.29 | 0.26 | 0.28 | 0.27 | 0.28 | 0.25 | 0.28 | 0.27 |
| Hydrofluoric acid 0.005% | 0.26 | 0.26 | 0.28 | 0.26 | 0.62 | 0.30 | 0.28 | 0.28 | 0.28 | 0.26 | 0.26 |
| Number of Projections, 3 nm or higher, Projections/50 × 50 μm | | | | | | | | | | | |
| Sulfuric acid 1% | 11 | 10 | 15 | 16 | 23 | 14 | 14 | 15 | 9 | 11 | 11 |
| Hydrofluoric acid 0.005% | 54 | 20 | 9 | 35 | 189 | 95 | 10 | 9 | 18 | 33 | 27 |

TABLE 4

| | Comparative Examples | | |
|---|---|---|---|
| | 1 | 2 | 3 |
| Composition mol % | | | |
| $SiO_2$ | 65.87 | 66.00 | 64.20 |
| $Al_2O_3$ | 9.84 | 11.00 | 11.30 |
| $Li_2O$ | 7.38 | 8.00 | 6.20 |
| $Na_2O$ | 9.56 | 9.05 | 8.30 |
| $K_2O$ | 0.18 | 0.00 | 2.00 |
| MgO | 2.88 | 2.38 | 2.00 |
| CaO | 4.25 | 3.57 | 6.00 |
| SrO | 0 | 0 | 0 |
| BaO | 0 | 0 | 0 |
| $TiO_2$ | 0 | 0 | 0 |
| $ZrO_2$ | 0 | 0 | 0 |
| $SiO_2$—$Al_2O_3$ | 56.03 | 55.00 | 52.90 |
| $R_2O$ | 17.12 | 17.05 | 16.50 |
| RO | 7.13 | 5.95 | 8.00 |
| Melting Temperature Tm (° C.) | 1556 | 1590 | 1579 |
| Working Temperature Tw (° C.) | 1055 | 1075 | 1093 |
| Liquid Phase Temperature Tl (° C.) | 1016 | 987 | 1075 |
| $T_w$–$T_l$ (° C.) | 39 | 88 | 18 |
| Density (g/cm3) | 2.47 | 2.47 | 2.49 |
| Average Thermal Expansion Coefficient, $\times 10^7$ ° $C^{-1}$, 50–350° C. | 89 | 87 | 91 |
| Etching Rate (nm/min), 50° C., 0.1% Hydrofluoric acid | 57 | 113 | 174 |
| Surface Roughness after cleaning Ra (nm) | | | |
| Sulfuric acid 1% | 0.41 | 0.49 | 0.58 |
| Hydrofluoric acid 0.005% | 0.26 | 0.26 | 1.1 |
| Number of Projections, 3 nm or higher, Projections/50 × 50 μm | | | |
| Sulfuric acid 1% | 26 | 39 | .70 |
| Hydrofluouric acid 0.005% | 583 | 835 | 1621 |

The base material of the glass substrate was fabricated as follows:

Batches were prepared of silica, alumina, lithium carbonate, sodium carbonate, basic magnesium carbonate, calcium carbonate, potassium carbonate, strontium carbonate, barium carbonate, titania, and zirconia, which are ordinary glass materials, in order to achieve the compositions shown in above Tables. The prepared batches were kept at 1550° C. for 4 hours in a platinum crucible, and then flowed onto an iron plate. The glasses were kept at 550° C. for 2 hours, and thereafter gradually lowered in temperature to 450° C. in 10 hours, after which the power supply was turned off to let the glasses be cooled to room temperature, thus producing glass specimens.

Characteristics of the glass specimens, i.e., a melting temperature Tm (temperature of log η=2), a working temperature Tw (temperature of log η=4), a liquid phase temperature Tl, a difference Tw−Tl between the working and liquid phase temperatures, and an average thermal expansion coefficient at a temperature in the range from 50° C. to 350° C. were measured and shown in Tables 1 through 4.

The viscosity of each of the glass specimens in a high temperature range was measured by an automatic viscosity measuring device with a pull-up platinum ball.

The liquid phase temperature of each of the glass specimens was measured as follows: The glass specimen was crushed and passed through a sieve of 2380 μm. Glass particles remaining on a sieve of 1000 μm were dipped in ethanol and ultrasonically cleaned, and thereafter dried in a high-temperature tank. 25 g of the glass particles were placed to a uniform thickness in a platinum boat having a width of 12 mm, a length of 200 mm, and a depth of 10 mm, and held for 2 hours in a furnace with a temperature gradient from 930 to 1180° C. Thereafter, the glass was removed from the furnace and observed for devitrification developed therein by an optical microscope at a magnification of 40. The highest temperature at which devitrification was observed was regarded as the liquid phase temperature.

The thermal expansion coefficient was determined by measuring the glass specimen, which was grinded into a cylindrical shape having a diameter of 5 mm and a length of 15 mm, with a thermal expansion rate measuring device on the market.

The glass substrates according to all Inventive Examples had excellent solubility and moldability and were of high quality free of foreign matter and warpage because Tm<1580° C., Tw<1100° C., and Tl<Tw.

Etching rates per minute when the glass substrates were etched with a hydrofluoric acid having a concentration of 0.1 weight at a temperature of 50° C. are shown in Tables. Each of the etching rates was measured as follows:

The glass specimen was cut into a doughnut shape having an outside diameter of 65 mm and an inside diameter of 20 mm, polished to a mirror finish (Ra=0.25 nm or less) to achieve a thickness of 0.635 mm, after which the glass specimen was cleaned with pure water, thereby producing a sample substrate. The sample substrate was then partly masked, dipped in a hydrofluoric acid having a concentration of 0.1 weight % at a temperature of 50° C. for 2.5 minutes. After the sample substrate was cleaned with water, the mask was removed, and the step between the masked area and the etched area was measured by a surface irregularity meter (α-STEP500 manufactured by TENCORINSTRUMENT). The etching rate was calculated based on the measured step.

The surface roughness Ra of the glass substrate of each of the compositions, as treated under two different conditions, is shown in Tables. The surface roughness Ra of each glass substrate was measured as follows:

A substrate prepared in the same manner as with the substrate measured for the etching rates was dipped in acid solutions at 50° C. for 2.5 minutes, and then dipped in an alkaline solution (aqueous solution of KOH with pH 11) at 50° C. for 2.5 minutes. After the substrate was cleaned in pure water and dried, it was observed in a field of 5 μm×5 μm by a scanning probe microscope (SPM SPI3700 manufactured by SII), and an average surface roughness Ra thereof was calculated. The average surface roughness Ra used herein represents a three-dimensional roughness applied to a surface based on the central line average roughness defined according to JIS B0601, and was calculated according to the following equation:

$$Ra = (1/n)_{i=1 \sim n} abs(Zi - Zo)$$

where n: the number of data points of the microscope,
  abs: absolute value,
  Zi: the height of the ith data point, and
  Zo: the average value of all Zi.

FIG. 1 is a graph showing the relationship between etching rates with a hydrofluoric acid having a concentration of 0.1 weight % at a temperature of 50° C. and surface roughnesses after cleaning, among the specimens shown in Tables. In FIG. 1, ▲ represents glass substrates treated with a hydrofluoric acid having a concentration of 0.005%, and ○ represents glass substrates treated with a sulfuric acid having a concentration of 1%. It can be seen from FIG. 1 that the surface roughness of the cleaned glass substrate changes greatly in an etching rate range from 30 to 60 nm/min. If the glass substrates whose etching rates exceed 30 nm/min. and 45 nm/min. are treated with 0.005% of hydrofluoric acid and 1% of sulfuric acid, then the surface roughness Ra of the treated glass substrates cannot be held below a desired surface irregularity level of Ra=0.3 nm.

Figure 2:
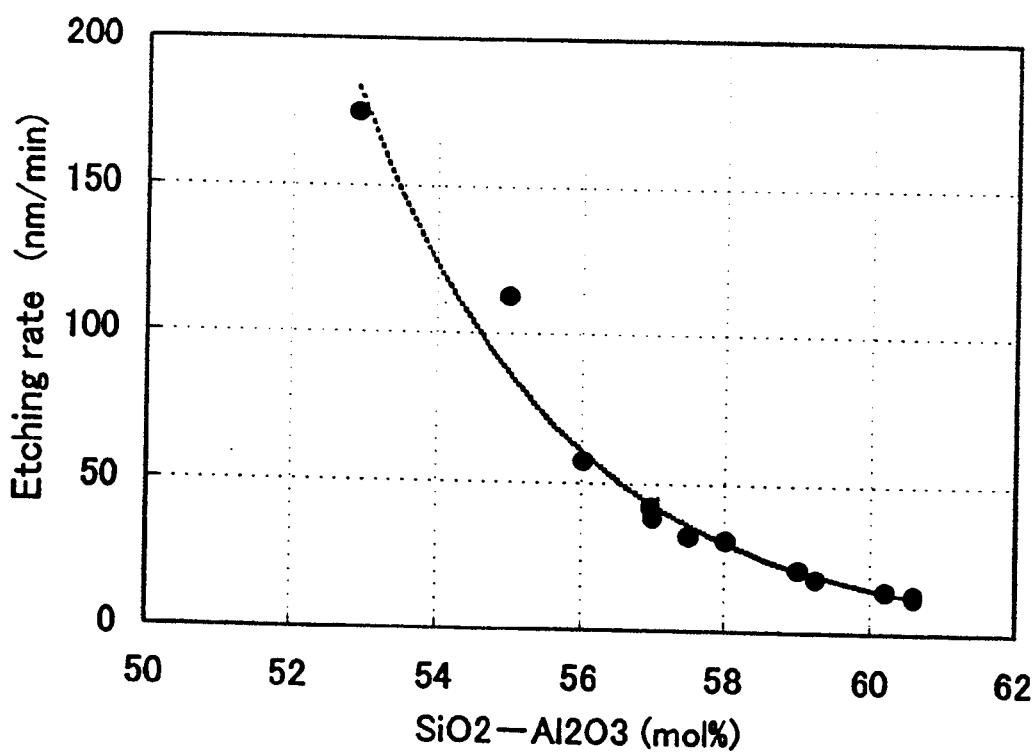
FIG. 2 is a graph showing the relationship between the difference $SiO_2$—$Al_2O_3$ and etching rates with a hydrofluoric acid a concentration of 0.1 weight % at a temperature of 50° C.

FIG. 2 is a graph showing the relationship between the difference $SiO_2$—$Al_2O_3$ and etching rates with a hydrofluoric acid a concentration of 0.1 weight % at a temperature of 50° C., among the specimens shown in Tables. A review of FIG. 2 indicates that the etching rate and the difference $SiO_2$—$Al_2O_3$ are correlated to each other very strongly. Values of the difference $SiO_2$—$Al_2O_3$ at the respective etching rates of 45 nm/min. and 30 nm/min. are 56.5% and 58.5%, respectively.

The glass substrates according to Comparative Examples have etching rates in excess of 60 nm/min. with a hydrofluoric acid having a concentration of 0.1 weight %, and surface roughnesses Ra in excess of 0.3 nm after being treated with acids. According to Comparative Examples, it is virtually impossible to remove foreign matter with an acid treatment and keep a desired level of surface smoothness after cleaning.

According to Inventive Examples 1–31, the glass substrates have etching rates equal to or less than 45 nm/min. with a hydrofluoric acid having a concentration of 0.1 weight %. The surface roughness of these glass substrates after the removal of foreign matter from their surface using 1% or less of sulfuric acid can be held to Ra=0.3 nm or less.

According to Inventive Examples 1–6, the glass substrates have etching rates equal to or less than 30 nm/min. with a hydrofluoric acid having a concentration of 0.1 weight %. The surface roughness of these glass substrates after the removal of foreign matter from their surface using 0.005 of hydrofluoric acid can be held to Ra=0.3 nm or less.

With the glass substrates according to Inventive Examples 1–31 and Comparative Examples 1–3, the substrate prepared in the same manner as measuring a surface roughness mentioned above was dipped in a hydrofluoric acid having a concentration of 0.005% at 50° C. for 2.5 minutes, and then dipped in an alkaline solution (aqueous solution of KOH with pH 11). It was observed In a field of 50 nm×50 nm by a scanning probe microscope, and a number of projections having a height of 3 nm or higher on the surface was counted. The result is shown in Tables 1 through 4. Since the substrates according to Inventive Examples 1–31 are high in acid resistance, surface irregularities are not produced by the acid and the number of such projection s was at most 500. Next, with the glass substrate according to Inventive Examples 10, the substrate prepared was dipped only in an alkaline solution (aqueous solution of KOH with pH 11) without dipping in a hydrofluoric acid. A number of projections having a height of 3 nm or higher on the surface was counted in the same manner mentioned above. The number of such projections was 4100/50 μm². This result shows that a number of projections having a height of at least 3 nm in an arbitrary area of 50 μm×50 μm can be at most 500 by cleaning with an acid, compared with the result in Inventive Example 10 where the glass substrate was dipped in a hydrofluoric acid. Further, in Inventive Example 10, the amount of cerium attached to the surface of the substrate was measured before cleaning and after cleaning. Before cleaning it was 32 µg and after cleaning it was 0.6 µg. The removal rate of cerium by cleaning with an acid was 98%. This shows that almost the projections are caused by a polishing compound which is left on the surface of the substrate and it can efficiently be removed by cleaning with an acid.

The glass substrates according to Inventive Examples were chemically strengthened by being dipped in a mixed molten salt of $KNO_3$ and $NaNO_3$ ($KNO_3$:$NaNO_3$=80:20), heated to 380° C., for one hour, and then observed for the thickness of a compressive stress layer by a polarization microscope. All of the glass substrates had a compressive stress layer having a thickness of 50 µm or more, and a composition suitable for chemical strengthening.

An actual application of a glass substrate according to the present invention to an information recording medium will be described below.

A disk having an outside diameter of 65 mm, an inside diameter of 20 mm, a thickness of 0,635 mm, and a surface roughness Ra of 0.25 nm was prepared in the same manner as the samples measured for their etching rates.

The disk was cleaned with a hydrofluoric acid having a concentration of 0.005% at a temperature of 50° C. to remove foreign matter from the surface thereof.

The disk was then cleaned successively with an aqueous solution of KOH with pH 11 at a temperature of 50° C. and pure water to produce a clean smooth surface.

The disk was then chemically strengthened by being dipped in a mixed molten salt of $KNO_3$ and $NaNO_3$ ($KNO_3$:$NaNO_3$=80:20), heated to 380° C., for one hour. The disk thus chemically strengthened was used as a glass substrate for an information recording medium.

An information recording medium was then prepared using the glass substrate thus produced.

A base layer of Cr, a recording layer of Co—Cr—Ta, and a protective layer of Cc were deposited on the glass substrate by sputtering. Then, a lubricating layer was deposited on the glass substrate, thus producing an information recording medium.

The information recording medium thus produced was loaded in a ramp-loading-type disk drive, and continuously operated at a rotational speed of 4,500 rpm. As a result, any error and head crash which would otherwise be caused by a collision between foreign matter on the medium and the head did not occur. It was confirmed that the information recording medium was suitable for use in a magnetic disk drive having a low glide height.

As described above, a glass substrate for an information recording medium according to the present invention has an etching rate of at most 45 nm/min. upon contact with a hydrofluoric acid having a temperature of 50° C. and a concentration of 0.1 weight %. Therefore, foreign matter attached to the surface of the glass substrate can be removed by an acid treatment. By treating the glass substrate with an alkali in combination with the acid treatment, the recording surface of the glass substrate can have an average surface roughness Ra smaller than 0.3 nm. As a consequence, the glass substrate makes it possible to provide a high-density information recording device with a low error rate.

Although certain preferred embodiments of the present invention have been shown and described in detail, it should be understood that various changes and modifications may be made therein without departing from the scope of the appended claims.

What is claimed is:

1. A manufacturing method of a glass substrate for an information recording medium comprising the steps of:

melting components for a glass having an etching rate of at most 45 nm/min. upon contact with a hydrofluoric acid having a temperature of 50° C. and a concentration of 0.1 weight %;

forming said melted components to a desired substrate shape;

polishing the surface of said substrate with a polishing compound;

removing the polishing compound which remain attached to the surface of said substrate by cleaning with an acid; and holding the surface smoothness (average surface roughness) Ra of said substrate in the range of Ra<0.3 nm by cleaning with an alkali.

2. A manufacturing method of a glass substrate for an information recording medium according to claim 1, wherein a sulfuric acid having a concentration in the range from 0.01 to 5 weight % is used for said cleaning with an acid.

3. A manufacturing method of a glass substrate for an information recording medium according to claim 1, a hydrofluoric acid having a concentration in the range from 0.002 to 1 weight % is used for said cleaning with an acid.

4. A manufacturing method of a glass substrate for an information recording medium comprising the steps of:

melting components for a glass having an etching rate of at most 30 nm/min. upon contact with a hydrofluoric acid having a temperature of 50° C. and a concentration of 6.1 weight %;

forming said melted components to a desired substrate shape;

polishing the surface of said substrate with a polishing compound;

removing the polishing compound which remain attached to the surface of said substrate by cleaning with an acid; and holding the surface smoothness (average surface roughness) Ra of said substrate in the range of Ra<0.3 nm by cleaning with an alkali.

5. A manufacturing method of a glass substrate for an information recording medium according to claim 4, wherein a sulfuric acid having a concentration in the range from 0.01 to 5 weight % is used for said cleaning with an acid.

6. A manufacturing method of a glass substrate for an information recording medium according to claim 4, a hydrofluoric acid having a concentration in the range from 0.002 to 1 weight % is used for said cleaning with an acid.

* * * * *